United States Patent [19]

Sherk et al.

[11] 4,368,321

[45] Jan. 11, 1983

[54] ELEVATED, DECLINING PRESSURE DEHYDRATION OF POLY(ARYLENE SULFIDE) PREPOLYMERIZATION MIXTURE

[75] Inventors: Fred T. Sherk; Harry B. Hammer, both of Bartlesville, Okla.

[73] Assignee: Phillips Petroleum Company, Bartlesville, Okla.

[21] Appl. No.: 298,442

[22] Filed: Sep. 1, 1981

[51] Int. Cl.$^3$ .............................................. C08G 75/14
[52] U.S. Cl. ................................................... 528/388
[58] Field of Search ........................................ 528/388

[56] References Cited

U.S. PATENT DOCUMENTS

| | | | |
|---|---|---|---|
| 3,354,129 | 11/1967 | Edmonds, Jr. et al. | 260/79 |
| 3,867,356 | 2/1975 | Campbell | 260/79.1 |
| 3,919,177 | 11/1975 | Campbell | 260/79.1 |
| 4,025,496 | 5/1977 | Anderson et al. | 260/79.1 |
| 4,038,259 | 7/1977 | Campbell et al. | 260/79 |
| 4,038,262 | 7/1977 | Edmonds, Jr. | 260/79.1 |
| 4,038,263 | 7/1977 | Edmonds, Jr. et al. | 260/79 |
| 4,039,518 | 8/1977 | Campbell | 260/79 |
| 4,056,515 | 11/1977 | Vidaurri, Jr. | 260/79.1 |
| 4,064,114 | 12/1977 | Edmonds, Jr. | 260/79.1 |

*Primary Examiner*—Melvyn I. Marquis

[57] ABSTRACT

A method for dehydrating pre-polymerization mixtures in the preparation of poly(arylene sulfide) in which a reaction mixture of a sulfur source and an organic amide are contacted at a first pressure within a range of about 20 psig to about 60 psig and an initial temperature in a range of about 300° F. to 400° F. to form a complex of the reactants with the mixture subsequently subjected to a decrease in pressure while elevating the temperature to a second temperature at which, at the chosen pressure, essentially all water is removed from the mixture. Other compounds including bases, alkali metal carboxylates, alkali metal carbonates, lithium halides, and lithium borate can be present in the reaction mixture. Preferably the sulfur source is sodium sulfide and the organic amide is N-methylpyrrolidone.

12 Claims, No Drawings

ELEVATED, DECLINING PRESSURE DEHYDRATION OF POLY(ARYLENE SULFIDE) PREPOLYMERIZATION MIXTURE

BACKGROUND OF THE INVENTION

This invention relates to the production of arylene sulfide polymer. More particularly, this invention is concerned with the heating and substantial dehydration of a portion of the reactants before the polymerization commences. In another aspect, this invention relates to heating and substantial dehydration under elevated pressure.

As described in U.S. Pat. No. 3,354,129, hereby incorporated by reference, poly(arylene sulfide), more particularly poly(phenylene sulfide), can be produced by first heating under atmospheric pressure a mixture of hydrated alkali metal sulfide in a polar solvent, particularly N-methyl-pyrrolidone, to remove water, particularly $H_2O$ of hydration, and then heating the resulting mixture with a polyhalo-substituted compound, particularly p-dichlorobenzene, to form an arylene sulfide polymer.

As described in U.S. Pat. No. 3,919,177, hereby incorporated by reference, the initial pre-polymerization mixture to be dehydrated can contain any suitable sulfur source, e.g., $Na_2S$; an organic amide, usually N-methyl-pyrrolidone; a base, usually NaOH; and an alkali metal carboxylate, e.g., sodium acetate. The initial pre-polymerization mixture can contain other additives that improve polymer properties such as alkali metal carbonates, lithium halides, lithium borate and the like which are specifially noted in U.S. Pat. Nos. 4,038,259, 4,038,263, and 4,039,518, respectively, all incorporated here by reference.

It is feasible to prepare a pre-polymerization mixture from sodium bisulfide, N-methylamino-butyrate and N-methyl-pyrrolidone, as described in U.S. Pat. No. 3,867,356 hereby incorporated as reference. It is also within the scope of this invention to prepare and dehydrate the pre-polymerization mixture by a two-step process described in U.S. Pat. No. 4,025,496, hereby incorporated by reference.

As described in U.S. Pat. No. 4,064,114, incorporated here by reference, foaming and column flooding are common operating problems of the dehydration, under atmospheric pressure, of pre-polymerization mixtures in an arylene sulfide polymerization process. In addition, the dehydration can result in variable sulfur losses, mainly in the form of hydrogen sulfide generated by the hydrolysis of the sulfur source. These variable sulfur losses can upset the stoichiometric balance of the initial reactants, more particularly sodium sulfide, sodium hydroxide, N-methyl-pyrrolidone and, optionally, sodium acetate, and can result in arylene sulfide polymer having undesirably low molecular weight (high flow rate) and/or in excessively low polymer yields. The effective control of sulfur losses during dehydration is essential in producing poly(arylene sulfide) that meets narrow flow rate and property specifications, at high yields. It is theorized, though not wishing to be bound by this theory, that the composition of the polymerizable complex formed and the extent of its formation during the heating and dehydration step prior to the addition of the polyhalo-substituted compound have a crucial effect on the subsequent polymerization reaction.

A method has now been discovered for dehydrating pre-polymerization mixtures under elevated, declining pressure conditions which results in the following improvements as compared to dehydration under essentially atmospheric pressure conditions: (a) reduced foaming of the heated mixture, controlled further by slight, temporary pressure increases which can be achieved more effectively than cooling the reactor; (b) reduced flooding of the distillation column, again controlled further by slight, temporary pressure increases; (c) more consistent and less extensive sulfur losses resulting in production of fewer off-specification polymer batches; (d) more rapid dehydration resulting in a shorter cycle time, i.e., time necessary to produce a poly(arylene sulfide) batch; and (e) shortened cycle time and reduced column flooding problems as compared to a process requiring controlled, elevated, constant pressure dehydration.

It is, therefore, an object of this invention to provide a method for dehydrating pre-polymerization mixtures in the preparation of poly(arylene sulfide). It is another object of this invention to provide dehydrated pre-polymerization mixtures using the process described herein. It is still another object of this invention to provide a method for polymerization of the dehydrated pre-polymerization mixtures produced by the present invention.

Other aspects, objects and the various advantages of this invention will become apparent upon reading this specification and the appended claims.

STATEMENT OF THE INVENTION

According to this invention, a method is provided in the preparation of poly(arylene sulfide) for dehydrating pre-polymerization mixtures in which a reaction mixture of a sulfur source and an organic amide is contacted at a first pressure within a range of about 20 psig to about 60 psig and at an initial temperature in the range of about 300° F. to 400° F. for a time sufficient for formation of a complex of the reactants and simultaneously, over a period of time, decreasing the pressure to a second pressure in a range of about 3 to about 25 psig and increasing the temperature to a final temperature at which, at the second pressure, essentially all water is removed from the mixture.

In a further embodiment of the invention a dehydrated pre-polymerization mixture is produced by the method set out above.

In a still further embodiment of the invention a method is provided for preparing polymers in which the dehydrated pre-polymerization mixture described above is contacted under polymerization conditions with at least one polyhalo-substituted compound.

In the process of the invention, the elevated, first pressure under which the dehydration of the pre-polymerization mixture is begun is preferably in a range of about 25 to about 42 psig. The final, dry point temperature, i.e., the temperature at which essentially all water has been removed from the mixture, will generally range from about 400° F. to about 500° F. and more preferably, from about 430° F. to about 480° F. The final dry point temperature is established by the selection of an appropriate reactor pressure preferably in a range of about 13 to about 20 psig.

Suitable sources of sulfur can be chosen from among any of those well known in the art which have been previously used in the production of poly(arylene sulfide). Among suitable sulfur sources are the alkali metal sulfides and alkali metal bisulfides which can be used alone and the following compounds which are used in the presence of at least one base. These sulfur sources include thiosulfates, unsubstituted and substituted thioureas, thioamides, thiocarbamates, thiocarbonates, and various others as described in U.S. Pat. No. 3,919,177.

Applicable bases used for the sulfur sources which can be employed include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate and mixtures thereof. If desired, the hydroxide can be produced in situ by the reaction of the corresponding oxide with water.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixture thereof.

Other additive compounds can be present in the reaction mixture that is dehydrated by the process of this invention. Among compounds used as additives to improve polymer properties are alkali metal carboxylates, alkali metal carbonates, lithium halides, and lithium borate.

Alkali metal carboxylates which can be employed in the process of this invention can be represented by the formula $RCO_2M$ where R is a hydrocarbyl radical selected from alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl, said hydrocarbyl radical having 1 to about 20 carbon atoms, and M is an alkali metal selected from the group consisting of lithium, sodium, potassium, rubidium and cesium. Preferably, R is an alkyl radical having 1 to about 6 carbon atoms or a phenyl radical and M is lithium or sodium, most preferably lithium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecano rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

Alkali metal carbonates that can be employed in the process of this invention include lithium carbonate, sodium carbonate, potassium carbonate, rubidium carbonate, cesium carbonate, and mixtures thereof.

Although the lithium halide can be lithium chloride, lithium bromide, lithium iodide or any mixture thereof, the lithium halide preferably is lithium chloride or lithium bromide, most preferably lithium chloride.

Dehydrated pre-polymerization mixtures prepared by the controlled, elevated pressure dehydration of this invention can be reacted with polyhaloaromatic compounds chosen from among P-dihalobenzenes and polyhaloaromatic compounds having more than 2 halogen substituents per molecule.

p-Dihalobenzenes which can be employed in the process of this invention can be represented by the formula

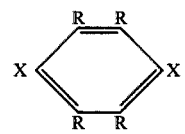

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Polyhaloaromatic compounds having 2 or more halogen substituents per molecule which can be utilized in preparing branched polymers and are useful in the practice of this invention, can be represented by the formula $R'X_n$, where each X is selected from the group consisting of chlorine, bromine, and iodine, n is an integer of 3 to 6, and R' is a polyvalent aromatic radical of valence n which can have up to about 4 methyl substituents, the total number of carbon atoms in R' being within the range of 6 to about 16.

Examples of some polyhaloaromatic compounds having more than two halogen substituents per molecule which can be employed in the process of this invention include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Although the reaction temperature at which the polymerization is conducted can vary over a wide range, generally it will be within the range of about 355° F. to about 545° F., preferably within the range of about 375°

F. to about 525° F. The reaction time can vary greatly, depending in part on the reaction temperature, but generally will be within the range of about 1 hour to about 60 hours, preferably within the range of about 2 hours to about 10 hours. In a presently preferred procedure, the polymerization is conducted within a first temperature range of about 355° F. to about 475° F., preferably from about 375° F. to about 475° F., and then within a second temperature range of about 475° F. to about 545° F. preferably about 475° F. to about 525° F., the total reaction time for the polymerization in these two temperature ranges being within the range of about 1 hour to about 60 hours, preferably about 2 hours to about 10 hours, about 15 percent to about 70 percent of which time is within the first temperature range, the temperature during at least 50 percent of the reaction time in the first temperature range being at least 35° F. below the final temperature in the second temperature range. Here, too, the reaction times are dependent, in part, on the reaction temperatures. In either or both of the temperature ranges, the temperature can be increased continuously or maintained predominantly at selected levels within relatively restricted temperature limits.

The pressure at which the polymerization reaction is conducted should be sufficient to maintain the p-dihalobenzene, the polyhaloaromatic compound having more than two halogen substituents per molecule, the organic amide, and any water present substantially in the liquid phase.

The following examples are presented to further illustrate the practice of this invention. It will be obvious to those skilled in the art to modify the described procedures without parting from the scope and spirit of the invention.

EXAMPLE I

In this control run, not in accordance with the invention, the dehydration of a mixture comprising sodium sulfide (prepared from aqueous solutions of NaOH and NaHS), sodium acetate, N-methyl-pyrrolidone and water was carried out at atmospheric pressure conditions. The dehydrated mixture was then heated with a mixture of p-dichlorobenzene and 1,2,4-trichlorobenzene to produce poly(arlyene sulfide).

10.25 lb. of sodium acetate and 25.0 gallons of N-methylpyrrolidone (NMP) were charged to a pilot plant reactor, which was then purged with nitrogen. An aqueous sodium sulfide solution formed by mixing 66.7 lb. of a 49.1 weight percent NaOH solution and 67.6 lb. of a solution containing 68.0 weight percent of NaHS and 1.2 weight percent of $Na_2S$ was added to the reactor, followed by flushing with 11.5 gallons of NMP.

The dehydration started at a temperature of 296° F. and a reactor pressure of 1 psig after heat-soaking, i.e., heating the mixture without allowing evaporation while the reactants began formation of a chemical complex, for 15 minutes at 294° F./1 psig. The reactor temperature during the evaporation of water was gradually increased to 402° F., the final dry-point temperature. The reactor pressure rose to 3 psig, whereas the pressure drop in the packed column above the reactor fluctuated somewhat erratically between 0.2 and 2.8 inches of water indicating flooding and/or foaming. The total dehydration time including the initial heat-soak period was 147 minutes.

Subsequently, 118.6 lb. of p-dichlorobenzene (DCB), 0.73 lb. of 1,2,4-trichlorobenzene (TCB), 7.5 lb. of water, and 2.0 gallons of NMP were added to the dehydrated reactor mixture. The polymerization reaction was carried out at temperature conditions starting at 390° F. and reaching a peak temperature of 510° F. The reactor pressure was 35 psig at the start and 194 psig at the end of the polymerization reaction, which lasted 4 hours 45 minutes.

The polymer solution was then treated with carbon dioxide at a temperature of about 511° F. and a pressure of about 190 to 215 psig for one hour. Subsequently NMP and other liquids were removed by flash evaporation for 90 minutes at initial temperature/pressure conditions of 511° F./215 psig and final conditions of 451° F./14 psig. The salt-filled arylene sulfide polymer was further desolventized in a flash blender at a temperature of 516° F. to 545° F. for about 20 minutes, washed three times with water, and dried.

EXAMPLE II

In this run, not according to this invention, a mixture comprising sodium sulfide (prepared from aqueous solutions of NaOH and NaHS), sodium acetate, NMP and water was dehydrated under controlled, essentially constant, elevated pressure conditions. The dehydrated mixture was then heated with p-dichloro-benzene (DCB) and 1,2,4-trichlorobenzene (TCB) to produce arylene sulfide polymer.

25.0 gallons of NMP and 19.7 lb. of sodium acetate were charged to a pilot plant reactor, which was then purged with nitrogen. An aqueous sodium sulfide solution formed by mixing 74.0 lb. of a 50.40 weight percent NaOH solution and 86.3 lb. of a solution containing 59.60 weight percent NaHS and 0.60 weight percent $Na_2S$ was added to the reactor, followed by flushing with 8.7 gallons of NMP.

The reactor mixture was heat-soaked for 15 minutes at 335° F./16 psig, and was then dehydrated at an essentially constant reactor pressure of 16 psig, i.e., there was some variation of pressure to maintain temperature but the variation was minimized. The initial temperature was 337° F., and the final dry-point temperature was 458° F. The total dehydration time including the initial heat-soak period was 130 minutes which, constitutes a reduction of 17 minutes or 12 percent as compared to the control run of Example I.

Thereafter, 129.9 lb. of DCB and 4.2 lb. of water were added to the dehydrated reactor mixture. The polymerization was carried out at initial temperature/pressure conditions of 441° F./57 psig and final temperature/pressure conditions of 511° F./185 psig. The total polymerization time was 3 hours 35 minutes. Then 0.35 lb. of TCB and 2 gallons of NMP were added to the reactor. Three minutes later the mixture was treated with carbon dioxide for 30 minutes at 505°–512° F. and a pressure of 175–218 psig.

Subsequently, NMP and other volatile components were removed by flash evaporation for 35 minutes at an initial temperature/pressure of 513° F./218 psig and final conditions of 511° F./165 psig. The salt-filled arylene sulfide polymers was recovered by further desolventizing in a flash blender at a temperature of 471°–549° F. for 36 minutes, washed three times with water, and dried.

EXAMPLE III

In this inventive run, a mixture comprising sodium sulfide (prepared from aqueous solutions of NaOH and NaHS), sodium acetate, N-methylpyrrolidone (NMP) and water was dehydrated at elevated, declining pressure conditions. The dehydrated mixture was then heated with a mixture of p-dichlorobenzene (DCB) and 1,2,4-trichlorobenzene (TCB) to produce arylene sulfide polymer.

23.5 lb. of sodium acetate and 25.7 lb. of NMP were charged to a reactor, which was then purged once with nitrogen. An aqueous solution prepared by mixing 71.7 lb. of a 50.6 weight percent solution of NaOH and 89.7 lb. of a solution containing 56.6 weight percent of NaHS and 0.31 weight percent of Na$_2$S was added to the reactor, followed by flushing with 8.0 gallons of NMP.

The dehydration started at a temperature of 360° F. and a pressure of 27 psig (gauge pressure) after heat-soaking for 15 minutes at 370° F./34 psig. The pressure was gradually reduced to about 16 psig during the dehydration. The reactor temperature rose to 449° F., the final dry-point temperature. Total dehydration time, including the initial heat-soak period was 109 minutes, which constitutes a 26 percent reduction in dehydration time as compared to the control run of Example I, and a 9 percent reduction as compared to the constant, elevated dehydration process of Example II.

Subsequently 134.2 lb. of DCB 0.43 lb. of TCB and 2 gallons of NMP were added to the dehydrated mixture. The polymerization was carried out at initial temperature/pressure conditions of 434° F./25 psig and final temperature/pressure conditions of 510° F./158 psig for 3 hours 45 minutes. The polymer solution was then treated with carbon dioxide for 30 minutes at 510°–513° F. and a pressure of 158–230 psig.

NMP and other volatile components were removed by flash evaporation for 8 minutes at initial temperature/pressure conditions of 512° F./230 psig and final temperature/pressure conditions of 509° F./40 psig. Further desolventizing was carried out in a flash blender at 529°–543° F. for 45 minutes. The salt-filled polymer was then washed three times with water, and dried.

EXAMPLE IV

In this example another inventive run according to the declining, elevated pressure dehydration process is described. 23.5 lb. of sodium acetate and 25.7 gallons of NMP were charged to a pilot plant reactor which was then purged with nitrogen three times. An aqueous solution prepared by mixing 71.4 lb. of a 50.7 weight percent NaOH solution and 88.0 lb. of a solution containing 58.7 weight percent of NaHS and 0.24 weight percent of Na$_2$S was added to the reactor, followed by flushing with 8.0 gallons of NMP.

The dehydration started at a temperature of 360° F. and a pressure of 26 psig, after heat-soaking for 10 minutes at about 366° F. and 40 psig. The pressure was gradually reduced to 17 psig during the dehydration, whereas the temperature increased to a final dry-point temperature of 459° F. Total dehydration time, including the initial heat-soak period, was 110 minutes, which constitutes a 25 percent reduction as compared to the control run of Example I and a reduction of 8 percent as compared to the constant, elevated pressure dehydration process of Example II.

Subsequently, 140.0 lb. of DCB, 0.61 lb. of TCB and 2.0 gallons of NMP were added to the dehydrated reactor mixture. The polymerization reaction was carried out at initial temperature/pressure conditions of 433° F./45 psig and final conditions of 510° F./155 psig. The polymerization reaction lasted 3 hours 25 minutes. The reaction mixture was then treated with carbon dioxide for 30 minutes at about 511° F. and a pressure of 155–230 psig.

The polymer was recovered by flash evaporation of NMP at a temperature of 494°–509° F., an initial pressure of 230 psig and a final pressure of 30 psig. The salt-filled polymer was further desolventized in a flash blender for 25 minutes at about 540° F., washed three times with water, and dried.

I claim:

1. A method in the preparation of poly(arylene sulfide) for dehydrating pre-polymerization mixtures comprising a reaction mixture of a sulfur source and an organic amide, said method comprising:
   (a) contacting a reaction mixture comprising a sulfur source and an organic amide at a first pressure within a range of about 20 psig to about 60 psig and an initial temperature in the range of about 300° F. to about 400° F. for a time sufficient for formation of a complex of the reactants, and subsequently
   (b) simultaneously, over a period of time, decreasing said pressure to a second pressure within the range of about 3 to about 25 psig and increasing the temperature to a final temperature, at which, at the second pressure, essentially all water is removed from the mixture.

2. A method of claim 1 in which said final temperature is in a range of about 400° F. to about 500° F.

3. A method of claim 2 in which said first pressure is in a range of about 25 to about 42 psig and said final temperature is in a range of about 430° F. to about 480° F.

4. A method of claim 1, 2, or 3 in which said sulfur source is chosen from among alkali metal sulfides and the organic amide is N-methyl-pyrrolidone.

5. A method of claim 1, 2, or 3 wherein additional compounds are present in the reaction mixture, said compounds chosen from among the group consisting of bases, alkali metal carboxylates, alkali metal carbonates, lithium halides, and lithium borate.

6. A method of claim 4 wherein additional compounds are present in the reaction mixture said compounds chosen from among the group consisting of bases, alkali metal carboxylates, alkali metal carbonates, lithium halides, and lithium borate.

7. A method of claim 4 wherein said sulfur source is sodium sulfide.

8. A method of claim 6 wherein said sulfur source is sodium sulfide and sodium acetate is also present.

9. A method for preparing polymers in which a dehydrated pre-polymerization mixture produced by the method of claim 1, 2 or 3 is contacted under polymerization conditions with at least one polyhalo-substituted compound.

10. A method for preparing polymers in which a dehydrated pre-polymerization mixture produced by the method of claim 4 is contacted under polymerization conditions with at least one polyhalo-substituted compound.

11. A method for preparing polymers in which a dehydrated pre-polymerization mixture produced by the method of claim 6 is contacted under polymerization conditions with at least one polyhalo-substituted compound.

12. A method for preparing polymers in which a dehydrated pre-polymerization mixture produced by the method of claim 8 is contacted under polymerization conditions with at least one polyhalo-substituted compound.

* * * * *